United States Patent [19]

Miyahara et al.

[11] 4,273,001
[45] Jun. 16, 1981

[54] GEAR TRANSMISSION

[75] Inventors: Masayoshi Miyahara; Morimitsu Katayama, both of Sakai; Hiroyuki Kisaka, Sennan, all of Japan

[73] Assignee: Kubota, Ltd., Naniwa, Japan

[21] Appl. No.: 24,030

[22] Filed: Mar. 26, 1979

[30] Foreign Application Priority Data

May 27, 1978 [JP] Japan .................................. 53-73313
Jun. 7, 1978 [JP] Japan .................................. 53-77472

[51] Int. Cl.³ .......................... F16H 3/08; F16H 37/06; G05G 9/12
[52] U.S. Cl. ....................................... 74/359; 74/15.4; 74/473 R
[58] Field of Search ................. 74/359, 325, 373, 374, 74/362, 366, 356, 357, 340, 360, 473 P, 361, 473 R, 15.4

[56] References Cited

U.S. PATENT DOCUMENTS

| 2,046,428 | 7/1936 | Riley | 74/340 |
| 2,273,068 | 2/1942 | Ross et al. | 74/473 |
| 2,329,354 | 9/1943 | McCarter | 74/473 |
| 2,542,911 | 2/1951 | Eaton | 74/360 |
| 2,549,096 | 4/1951 | Jacobi | 74/473 |
| 2,727,602 | 12/1955 | Saives | 74/359 |
| 3,110,191 | 11/1963 | Schulze | 74/373 |
| 3,830,111 | 10/1974 | Travaglio | 74/15.4 |
| 4,048,870 | 9/1977 | Hülsebusch | 74/473 R |
| 4,094,206 | 6/1978 | Sogo et al. | 74/360 |
| 4,136,575 | 1/1979 | Labat | 74/360 |

Primary Examiner—Allan D. Herrmann
Attorney, Agent, or Firm—Kane, Dalsimer, Kane, Sullivan and Kurucz

[57] ABSTRACT

A gear transmission comprising a driving transmission shaft, a driven transmission shaft, a gear shaft between the two transmission shafts, three speed change gears of different diameters mounted on the gear shaft, an auxiliary speed change shaft carrying three gears of different diameters respectively in mesh with the speed change gears, and two clutch members provided between one or the other of the transmission shafts and the gear shaft. Each clutch member provides two speeds by switching between a position to connect one of the transmission shafts to the gear shaft and a position to connect the transmission shaft to one of the speed change gears. Thus the gear transmission provides a total of four speeds.

4 Claims, 6 Drawing Figures

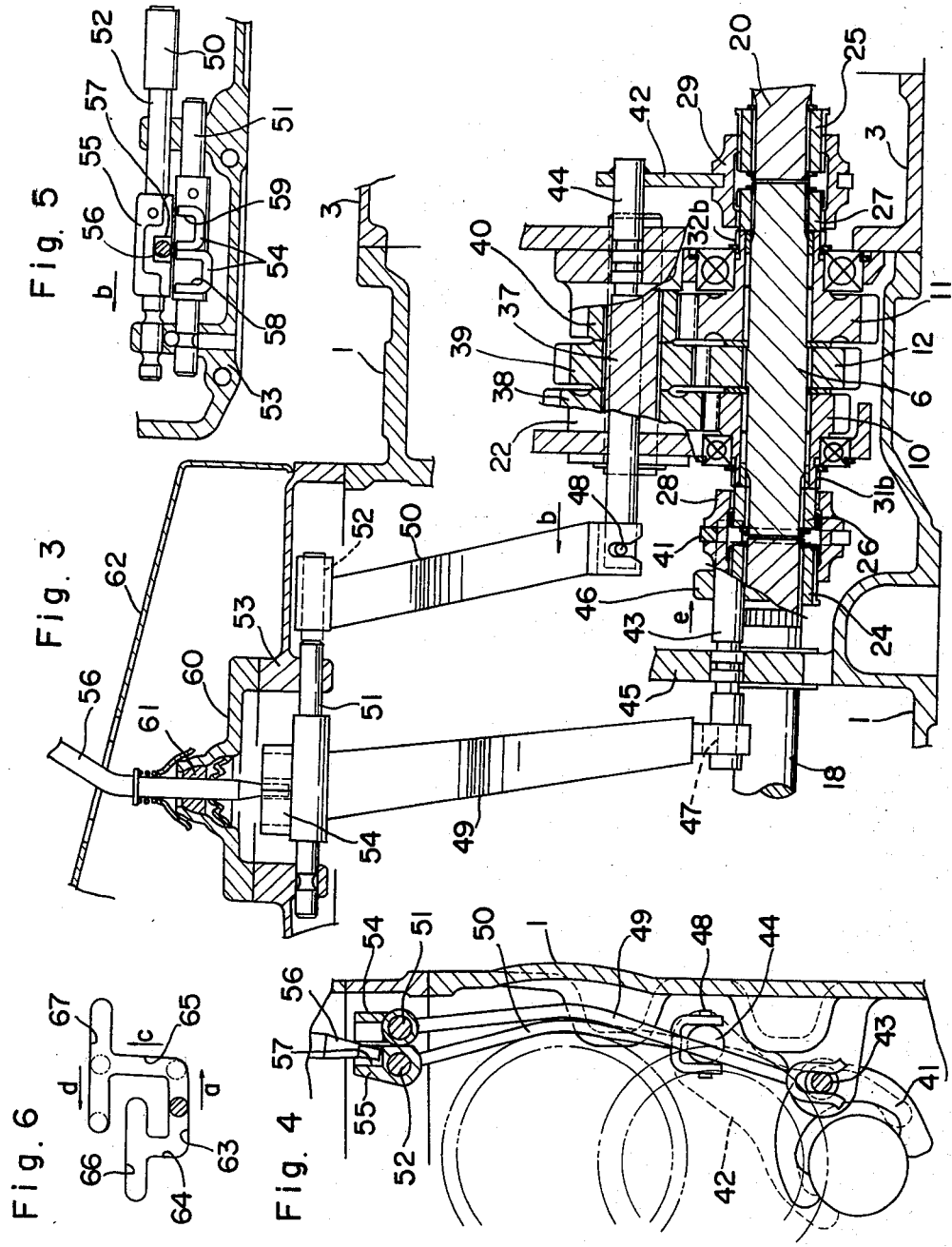

GEAR TRANSMISSION

BACKGROUND OF THE INVENTION

This invention relates to a gear transmission and particularly to a gear transmission of the type having gears in constant mesh and capable of four step speed changes.

To provide four speeds with constant mesh gearing, the existing transmission generally comprises four gears of different diameters mounted on a gear shaft with axial spacing between one another, four speed change gears mounted for relative rotation on a speed change shaft, and two clutch members interposed between the adjacent speed change gears to effect speed changes. Thus the existing transmission requires a total of eight gears and two clutch members.

SUMMARY OF THE INVENTION

The primary object of this invention is to provide an improvement on the above gear transmission which is capable of four step speed changes with six speed change gears which are two less than in the conventional arrangement, thereby to realize a simplified construction and a compact installation, and particularly to assure installation in a very limited space as allowed for a tractor transmission.

To this end the gear transmission according to this invention comprises a driving transmission shaft, a driven transmission shaft coaxial with the driving transmission shaft, a gear shaft disposed between and coaxial with the transmission shafts, a speed change gear fixedly mounted on the gear shaft and first and second speed change gears mounted for free rotation thereon, the fixed gear being disposed between the rotatable gears, the three speed change gears being different from one another in diameter, an auxiliary speed change shaft carrying three fixed gears having different diameters from one another and meshing with the fixed gear and the two rotatable gears on the gear shaft respectively, a first clutch member provided to extend from the driving transmission shaft to the gear shaft and adapted to switch between a position to connect the driving transmission shaft to the gear shaft and a position to connect the driving transmission shaft to the first rotatable gear, and a second clutch member provided to extend from the gear shaft to the driven transmission shaft and adapted to switch between a position to connect the gear shaft to the driven transmission shaft and a position to connect the second rotatable gear to the driven transmission shaft.

Such an arrangement is capable of providing four speeds by a combination of two clutch members and six gears in total which are three speed change gears of different diameters mounted on the gear shaft and three speed change gears of different diameters mounted on the auxiliary speed change shaft. Thus the number of gears used in the conventional art has been reduced by two. This not only simplifies the construction but results in economy in the number of components and expedites assembly and disassembly. The distance between bearings can be shortened by at least the thickness of one gear, which has such advantages as permitting a compact design in the forward-rearward direction and reducing the load of gear interlocking that falls on the bearing portions.

Other objects and advantages of this invention will be apparent from the following details description and the drawings.

BRIEF DESCRIPTION OF THE DRAWINGS

In the drawings illustrating an embodiment of this invention;

FIG. 3 is a side view partly broken away of a speed change mechanism;

FIG. 4 is a front view partly broken away of the speed change mechanism;

FIG. 5 is an explanatory view showing the manner of engagement between a speed change hand lever and two engaging elements which constitute part of the speed change mechanism; and FIG. 6 is a plan view of a guide plate.

DESCRIPTION OF THE PREFERRED EMBODIMENT

The invention is now described in detail as applied to the power takeoff portion of the tractor transmission. It should be understood that the invention is of course applicable to the travelling speed change portion of a tractor transmission as well. In addition to the tractor, the invention finds application to the transmissions of various machines for agriculture and other industries.

Figure 1:
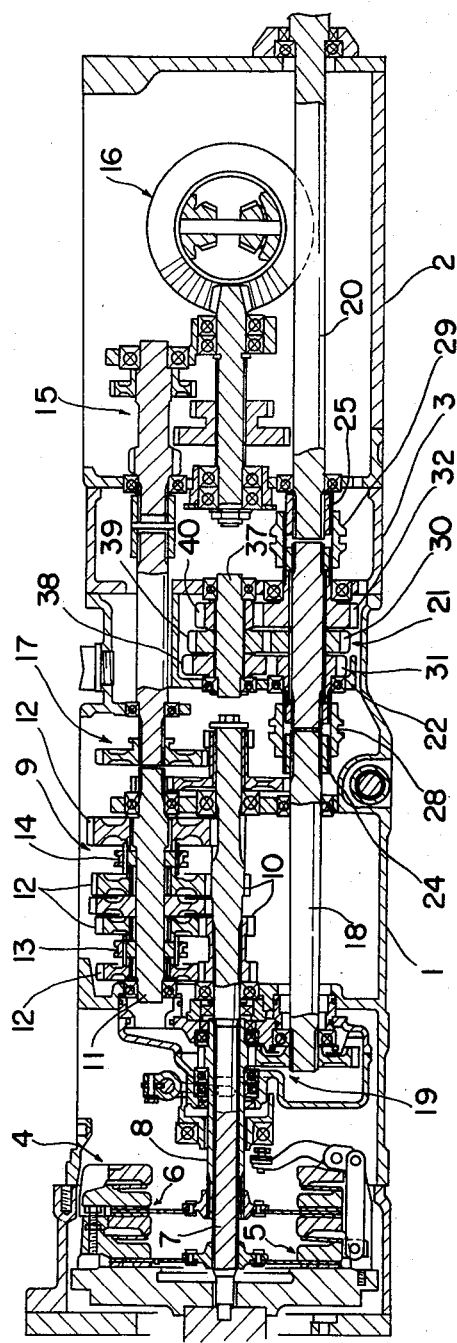
FIG. 1 is a sectional view of a whole tractor transmission whose power takeoff portion is arranged according to this invention.

In FIG. 1, reference numeral 1 indicates a first transmission case, 2 a second transmission case, and 3 an intermediate case provided therebetween. These cases 1, 2 and 3 are mounted on a tractor as part of its frame.

A main clutch assembly 4 comprises a first clutch 5 for a travelling system and a second clutch 6 for a power takeoff system. The first clutch 5 is released by an initial manipulation of a clutch operator device not shown in the drawing, and both the first and second clutches 5 and 6 are released by a further manipulation of the clutch operator device.

A drive shaft 7 for the travelling system and a drive shaft 8 for the power takeoff system are in double shaft configuration and are connected to and disconnected from the engine by operating the main clutch assembly 4.

A first travelling speed change portion 9 comprises a group of gears 10 of different diameters mounted on the drive shaft 7 and a group of speed change gears 12 mounted on a speed change shaft 11 located above and parallel to the drive shaft 7, the two groups of gears being in constant mesh. The first speed change portion 9 is adapted to provide four speeds by sliding each of clutch members 13 and 14. The first speed change portion 9 is housed in the first case 1 and drives differential means 16 through a second two step speed change portion 15 housed in the second case 2.

Reference numeral 17 indicates super-reduction means.

Reference numeral 18 indicates a transmission shaft of the power takeoff system located below and parallel to the drive shaft 7. For expediency, this transmission shaft 18 is termed in this specification as the driving transmission shaft. Gear transmission means 19 is provided between the drive shaft 8 and the driving transmission shaft 18 to effect reduction in transmitting power to the latter.

Reference numeral 20 indicates a further transmission shaft of the power takeoff system which is termed here as the driven transmission shaft. The shaft 20 is supported coaxial with the driving transmission shaft 18 by the second case 2.

Reference numeral 21 indicates a power takeoff transmission according to this invention, which is removably mounted to extend from the first case 1 to the intermediate case 3.

Figure 2:
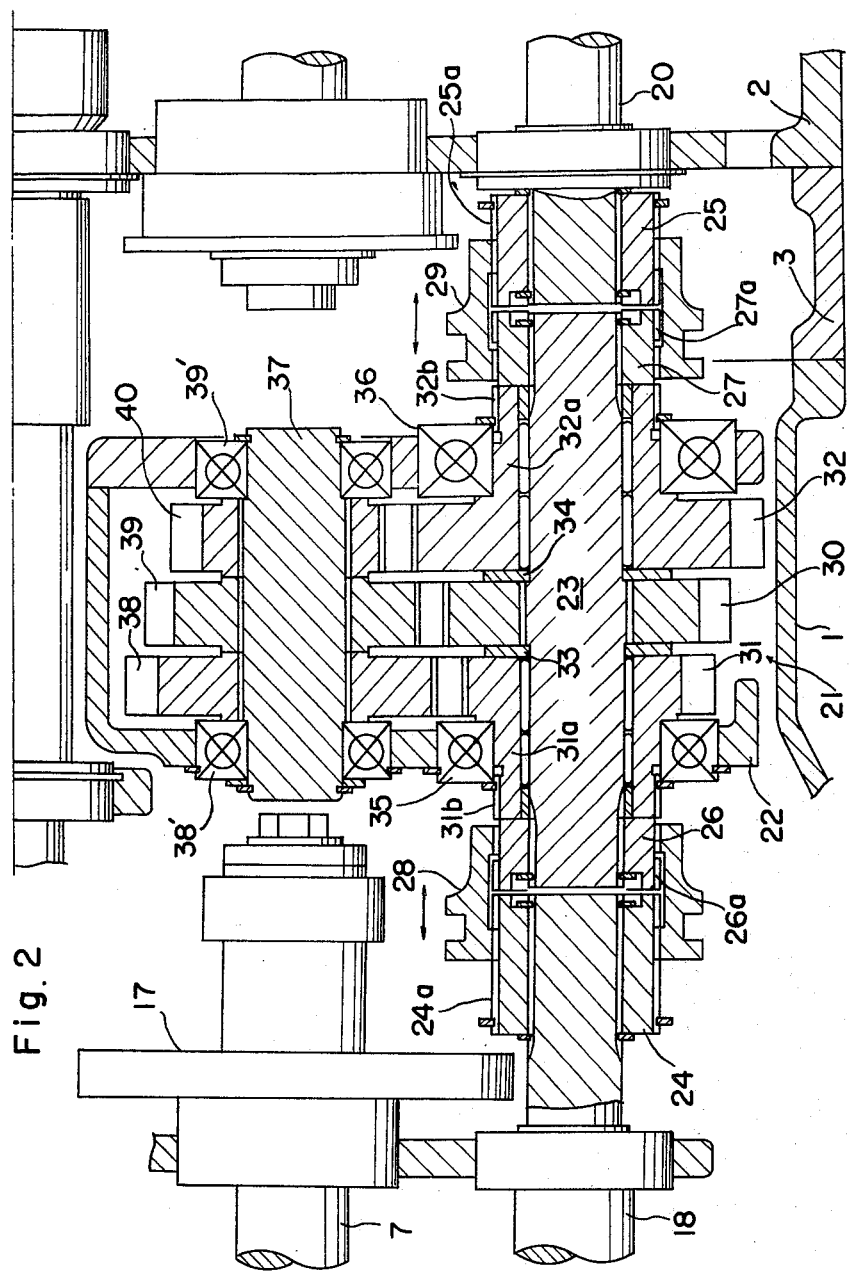
FIG. 2 is a detailed sectional view of a gear transmission according to this invention.

Referring to FIG. 2, a gear case 22 is removably attached to the front wall of the intermediate case 3, and a gear shaft 23 is mounted between and coaxial with the driving transmission shaft 18 and the driven transmission shaft 20.

The gear shaft 23 carries a speed change gear 30 securely fixed at mid point in the axial direction and two speed change gears 31 and 32 mounted with the fixed gear 30 in between and for free rotation relative to the gear shaft 23 by means of needles or the like. The speed change gears 30, 31 and 32 have diameters varying from one to the other; gear 31 is smaller than gear 30 and gear 30 smaller than gear 32. Thrust collars 33 and 34 are provided respectively between gears 31 and 30 and between gears 30 and 32.

The rotatable gears 31 and 32 respectively have boss portions 31a and 32a on which bearings 35 and 36 are fitted to allow the gear case 22 to support the gear shaft 23 for free rotation. The boss portions 31a and 32a respectively include fifth and sixth meshing portions 31b and 32b defined on outward end peripheries thereof so as to engage with clutch members 28 and 29 described below. These fifth and sixth meshing portions 31b and 32b are arranged to protrude from the gear case 22.

Reference numeral 37 indicates an auxiliary speed change shaft supported by the gear case 22 through a pair of bearings 38' and 39' so as to be sustantially parallel to the gear shaft 23 and coaxial with drive shaft 7. There are three speed change gears 38, 39 and 40 of different diameters fixedly mounted on the auxiliary speed change shaft 37. The largest gear 38 is in constant mesh with the smallest gear 31 on the gear shaft 23, the medium gear 39 with the corresponding medium gear 30, and the smallest gear 40 with the largest gear 32 on the gear shaft 23. The order of the gears from small to large is 40, 31, 39, 30, 38 and 32.

The driving transmission shaft 18 carries at the rearward end thereof a first tube member 24 having a first meshing portion 24a, and the driven transmission shaft 20 carries at the forward end thereof a second tube member 25 having a second meshing portion 25a. The gear shaft 23 carries, at the end adjacent to the driving transmission shaft 18, a third tube member 26 having a third meshing portion 26a and, at the end adjacent to the driven transmission shaft 20, a fourth tube member 27 having a fourth meshing portion 27a. Axial movement of the tube members 24, 25, 26 and 27 are restricted by stopper rings or the like. Each of the meshing portions 31b, 32b, 24a, 25a, 26a and 27a is in the form of spline.

Reference numeral 28 indicates a first clutch member mounted axially slidably along the first tube member 24, the third tube member 26 and the first boss portion 31a, and adapted to switch between a position to engage the first and third meshing portions 24a and 26a, a position to engage the first and the fifth meshing portions 24a and 31b, and a neutral position. Reference numeral 29 indicates a second clutch member mounted axially slidably along the second tube member 25, the fourth tube member 27 and the second boss portion 32a, and adapted to switch between a position to engage the second and fourth meshing portions 25a and 27a, a position to engage the second and sixth meshing portions 25a and 32b, and a neutral position.

In the above arrangement, transmission of engine output to the drive shaft 8 is effected or broken by operating the second clutch 6 of the main clutch assembly 4, and rotation of the drive shaft 8 is transmitted to the driving transmission shaft 18 at a reduced ratio via the gear transmission means 19.

The torque of the driving transmission shaft 18 is transmitted to the driven transmission shaft 20 without changing when the first clutch member 28 is moved from the neutral position as shown to the position to engage the meshing portions 24a and 26a and the second clutch member 29 moved from the neutral position as shown to the position to engage the meshing portions 25a and 27a.

When the first clutch member connects the meshing portions 24a and 26a and the second clutch member 29 connects the meshing portions 25a and 32b, the torque of the driving transmission shaft 18 is transmitted at a certain reduction ratio to the driven transmission shaft 20 via gears 30, 39, 40 and 32.

When the first clutch member 28 connects meshing portions 24a and 31b and the second clutch member 29 connects the meshing portions 27a and 25a, the torque of the driving transmission shaft 18 is transmitted at a certain other reduction ratio to the driven transmission shaft 20 via gears 31, 38, 39 and 30.

When the first clutch member 28 connects the clutch meshing portions 24a and 31b and the second clutch member 29 connects the meshing portions 32b and 25a, the torque of the driving transmission shaft 18 is transmitted at a still other reduction ratio to the driven transmission shaft 20 via gears 31, 38, 40 and 32.

In short, the first and second clutch members 28 and 29 each provide a selection between two speeds, and accordingly the power takeoff transmission 21 as a whole provides four speeds by the combined operation of the clutch members 28 and 29.

When operating the clutch members 28 and 29, the second clutch 6 is placed out of engagement; the second clutch 6 operated after the two clutch members 28 and 29 have assumed engaging positions.

A description will be made hereinafter about a speed change operating mechanism for the power takeoff transmission 21, namely a switching mechanism for the clutch members 28 and 29.

As shown in FIGS. 3 and 4, the first clutch member 28 is connected with a first shift fork 41 and the second clutch member 29 is connected with a second shift fork 42. The shift forks 41 and 42 are securely welded to the rear ends of their respective first and second fork rods 43 and 44. The first fork rod 43 is supported by intermediate walls 45 and 46 defined on the first case 1, and the second fork rod 44 is supported by the gear case 22, the rods 43 and 44 being slidable back and forth and adjustable by position adjusting means not shown. While in conventional practice the second fork rod 44 has been given a softening treatment over the whole length to allow for deformation that occurs when the second shift fork 42 is welded, in this enbodiment the softening treatment is applied only to the rear end portion thereof so that the welding deformation is accommodated in the portion rearward of a position adjusting groove. The fork rods 43 and 44 are formed of drawn rod or the like.

The fork rods 43 and 44 are operable respectively by first and second fork levers 49 and 50 which engage the fork rods 43 and 44 at engaging portions 47 and 48 defined at the forward ends thereof. The fork levers 49 and 50 are securely attached to respective first and second shift rods 51 and 52. Reference numeral 53 indicates a speed change base mounted on the first case 1. As shown in FIG. 5, the base 53 supports the shift rods 51 and 52 in parallel with one another and slidably in the forward-rearward direction.

The first fork lever 49 is integrally provided with a first engaging element 54 at the top thereof. A second engaging element 55 is secured to the second shift rod 52 in a manner opposed to the first engaging element 54. The second engaging element 55 defines a second engaging recess 57 to engage with a speed change lever 56. The first engaging element 54 defines two first engaging recesses 58 and 59 which are opposed to the forward and rearward positions of the second engaging recess 57 so as to engagingly receive the lever 56 after shifting the second engaging element 55 into either position. Of the two first recesses 58 and 59, one has a greater sideways depth than the other. The speed change lever 56 is supported by a speed change covering 60 through a spherical element 61 so as to be oscillatable in forward and rearward and right and left directions.

Reference numeral 62 indicates a speed change guide plate which, as shown in FIG. 6, defines a second guide slot 63 to guide the speed change lever 56 in engagement with the second engaging element 55, selection guide slots 64 and 65 extending from the ends of the second guide slot 63 in a direction normal thereto, and first guide slots 66 and 67 to guide the speed change lever 56 in engagement with the first engaging recesses 58 and 59 of the first engaging element 54, respectively. The selection guide slots 64 and 65 have different lengths corresponding to the depths of the first engaging recesses 58 and 59, and the first guide slots 66 and 67 are staggered so that their adjacent ends overlap in the forward-rearward direction.

The above arrangement provides the two engaging recesses 58 and 59 in one of the engaging elements 54 so as to engage the speed change lever 56 when the other engaging element 55 has been operated, and this is distinct from the arrangement in which two speed change operating mechanisms are actuated merely by a single lever. The arrangement of this invention effects speed changes by a combination of two speed change mechanisms and provides for a very easy operation. Of the engaging recesses 58 and 59 of the engaging element 54 one is formed deeper than the other, and this feature makes the operational range of the speed change lever 56 small, which adds to excellent operability.

The following is one example of the speed changing operation. Assume the speed change lever 56 is in the neutral position in the middle of the second guide slot 63 and in engagement with the second engaging recess 57 of the second engaging element 55. When the lever 56 is moved along the second guide slot 63 in the direction indicated by arrow a to an end of the slot 63, an operational force is applied to the second engaging element 55 in the direction indicated by arrow b, whereby the second shift rod 52, the second fork lever 50 and the second fork rod 44 move in the b direction. This causes the second clutch member 29 to slide in the same direction and connect the rotatable speed change gear 32 and the transmission shaft 20. At this time the second engaging recess 57 of the second engaging element 55 comes into opposed relation with the first engaging recess 58 of the two first engaging recesses 58 and 59 on the first engaging element 54. The speed change lever 56 is then moved from the a direction end of the second guide slot 63 in the direction indicated by arrow c, leaving the second engaging element 55 and coming into engagement with the first engaging recess 58 of the first engaging element 54. The lever 56 is now in the neutral position in the middle of the first guide slot 67. Assume the lever 56 is then moved along the first guide slot 67 in the direction indicated by arrow d. This causes movement in the e direction of the first shift rod 51, the first fork lever 49 and the first fork rod 43 by means of the first engaging element 54, whereby the first clutch member 28 connects the transmission shaft 18 and the rotatable speed change gear 31. Thus, power is transmitted from the driving transmission shaft 18 to the driven transmission shaft 20 by way of the first clutch member 28, rotatable speed change gear 31, speed change gear 38, auxiliary speed change shaft 37, speed change gear 40, rotatable speed change gear 32 and the second clutch member 29.

The operations for the three remaining speeds will be readily analogized from the above description.

We claim;

1. A gear transmission comprising:
   a driving transmission;
   a driven transmission shaft coaxial with said driving transmission shaft;
   a speed change shaft disposed between and coaxial with said transmission shafts and provided with three speed change gears having different diameters from one another, namely first and second freely rotatable gears and a fixed gear arranged between said rotatable gears;
   an auxiliary speed change shaft provided with three fixed auxiliary speed change gears having different diameters from one another and constantly meshing with said three speed change gears on said speed change shaft respectively;
   a first tube member secured to a rear end portion of said driving transmission shaft and having a first meshing portion with splines on an outer periphery thereof;
   a second tube member secured to a front end portion of said driven transmission shaft and having a second meshing portion with splines on an outer periphery thereof;
   third and fourth tube members secured to rear and front end portions of said speed change shaft and having third and fourth meshing portions with splines on outer peripheries thereof respectively;
   first and second boss portions formed as integral extensions of said freely rotatable gears and having fifth and sixth meshing portions with splines on outer peripheries thereof, said six meshing portions all having the same outer diameter and the outer splines of the same shape and number;
   a first tubular clutch member with splines on an inner periphery thereof slidable from said first tube member to said first boss portion through said third tube member and switchable between a position to mesh with said first and third meshing portions, a position to mesh with said first and fifth meshing portions, and a neutral position, and a second tubular clutch member with splines on an inner periphery thereof slidable from said second tube member to said second boss portion through said fourth tube member and switchable between a position to mesh with said second and fourth meshing portions, a position to mesh with said second and sixth meshing portions, and a neutral position.

2. A gear transmission as claimed in claim 1 wherein said three speed change gears and said first to fourth tube members are disposed axially close to one another.

3. A gear transmission as claimed in claim 1 further comprising an oppositely disposed pair of engaging elements operatively connected to said two clutch members respectively, and a speed change hand lever adapted to engage with said engaging elements in an alternative manner.

4. A gear transmission as claimed in claim 3 wherein one of said engaging elements has two engaging recesses to be engageable with said speed change lever whichever speed change position the other engaging element assumes, one of said engaging recesses being deeper than the other.

* * * * *